(12) United States Patent
Lee et al.

(10) Patent No.: US 10,289,744 B2
(45) Date of Patent: May 14, 2019

(54) METHOD AND APPARATUS FOR MANAGING CONTENT IN A PROCESSING DEVICE

(75) Inventors: Keum-koo Lee, Gyeonggi-do (KR); Hee-jeong Choo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 13/324,571

(22) Filed: Dec. 13, 2011

(65) Prior Publication Data

US 2012/0209804 A1   Aug. 16, 2012

(30) Foreign Application Priority Data

Feb. 11, 2011   (KR) ........................ 10-2011-0012482

(51) Int. Cl.
*G06F 17/30* (2006.01)
*G06F 8/61* (2018.01)

(52) U.S. Cl.
CPC ............ *G06F 17/3089* (2013.01); *G06F 8/61* (2013.01); *G06F 17/30887* (2013.01)

(58) Field of Classification Search
CPC .. G06F 17/30587; G06F 17/3089; G06F 8/61; G06F 17/30887
USPC ................... 707/635, 610; 717/178
See application file for complete search history.

(56) References Cited

U.S. PATENT DOCUMENTS

| | | | |
|---|---|---|---|
| 6,524,189 B1 * | 2/2003 | Rautila ................... | A63F 13/12 463/39 |
| 7,434,217 B2 * | 10/2008 | Morris ......................... | 717/177 |
| 8,135,825 B2 | 3/2012 | Wendling | |
| 2005/0004995 A1 * | 1/2005 | Stochosky .......... | H04L 12/1813 709/219 |
| 2005/0198376 A1 | 9/2005 | Kotzin | |
| 2006/0048141 A1 * | 3/2006 | Persson ..................... | G06F 8/61 717/176 |
| 2006/0059174 A1 * | 3/2006 | Mese ....................... | G06F 9/445 |
| 2006/0253592 A1 | 11/2006 | Oashi et al. | |
| 2007/0130541 A1 | 6/2007 | Louch et al. | |
| 2007/0143446 A1 | 6/2007 | Morris | |
| 2007/0265094 A1 * | 11/2007 | Tone et al. ...................... | 463/42 |
| 2008/0162435 A1 | 7/2008 | Dooms et al. | |
| 2009/0002333 A1 | 1/2009 | Maxwell et al. | |
| 2010/0251346 A1 * | 9/2010 | Dumais .............................. | 726/5 |
| 2010/0281475 A1 * | 11/2010 | Jain et al. ..................... | 717/172 |

(Continued)

FOREIGN PATENT DOCUMENTS

| CN | 1471008 | 1/2004 |
|---|---|---|
| CN | 1806465 | 7/2006 |

(Continued)

OTHER PUBLICATIONS

Chinese Office Action dated May 27, 2015 issued in counterpart application No. 201180067382.4.

(Continued)

*Primary Examiner* — Kristopher Andersen
(74) *Attorney, Agent, or Firm* — The Farrell Law Firm, P.C.

(57) ABSTRACT

A method and apparatus for managing content in a processing device are provided. The content management method includes receiving information regarding first content from a first external device; and acquiring second content related to the first content based on the received information regarding the first content.

24 Claims, 5 Drawing Sheets

(56) References Cited

U.S. PATENT DOCUMENTS

2010/0312817 A1* 12/2010 Steakley ................ 709/202
2011/0010704 A1*  1/2011 Jeon et al. ............... 717/178

FOREIGN PATENT DOCUMENTS

| | | |
|---|---|---|
| CN | 101336423 | 12/2008 |
| CN | 101378400 | 3/2009 |
| CN | 101529380 | 9/2009 |
| CN | 101799765 | 8/2010 |
| EP | 2 175 366 | 4/2010 |
| GB | 2470811 | 12/2010 |
| KR | 1020080023960 | 3/2008 |
| KR | 100848891 | 7/2008 |
| KR | 1020090000304 | 1/2009 |
| KR | 1020090082349 | 7/2009 |
| KR | 1020100040431 | 4/2010 |
| KR | 1020100137659 | 12/2010 |
| WO | WO 2005/109820 | 11/2005 |

OTHER PUBLICATIONS

Australian Examination Report dated Oct. 19, 2015 issued in counterpart application No. 2011358857, 5 pages.
Chinese Office Action dated Nov. 5, 2015 issued in counterpart application No. 201180067382.4, 24 pages.
Chinese Office Action dated Dec. 5, 2016 issued in counterpart application No. 201180067382.4, 20 pages.
Korean Office Action dated Jul. 14, 2017 issued in counterpart application No. 10-2011-0012482, 11 pages.

* cited by examiner

METHOD AND APPARATUS FOR MANAGING CONTENT IN A PROCESSING DEVICE

PRIORITY

This application claims priority under 35 U.S.C. § 119(a) to Korean Patent Application No. 10-2011-0012482, which was filed in the Korean Intellectual Property Office on Feb. 11, 2011, the entire disclosure of which is incorporated herein by reference.

BACKGROUND OF THE INVENTION

1. Field of the Invention

The present invention relates generally to a method and apparatus for managing content in a processing device, and more particularly, to a method and apparatus for managing content that is automatically installed at a device, when the content is shared with a plurality of devices.

2. Description of the Related Art

In current mobile devices, it is common for users to install applications and widgets therein, which allow the users quickly request or shorten an access path to a specific service. A newer market trend is to provide these same types of applications and widgets to larger and fixed products such as televisions or set top boxes. Accordingly, application or widget providers establish application stores where a user directly accesses and downloads the applications or widgets into each device, besides a general web site where a user downloads them into each web browsing available device.

More specifically, a current user may download applications or widgets into a web browsing available device such as a personal computer and then transfer the applications or widgets into a target device. Alternatively, user may use the target device itself to directly access an application store, and search for and directly download the applications or widgets.

SUMMARY OF THE INVENTION

Accordingly, an aspect of the present invention is to provide a method and device, which allows a user of a device to download content from a server, the content corresponding to content running on another device.

In accordance with an aspect of the present invention, a content management method in a processing device is provided. The method includes receiving information regarding first content from a first external device; and acquiring second content related to the first content based on the received information regarding the first content.

In accordance with another aspect of the present invention, a content management device is provided. The content management device includes a communication unit that receives information regarding first content from a first external device; and a control unit that acquires second content related to the first content based on the received information regarding the first content.

BRIEF DESCRIPTION OF THE DRAWINGS

The above and other aspects, features, and advantages of certain embodiments of the present invention will become more apparent from the following detailed description when taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
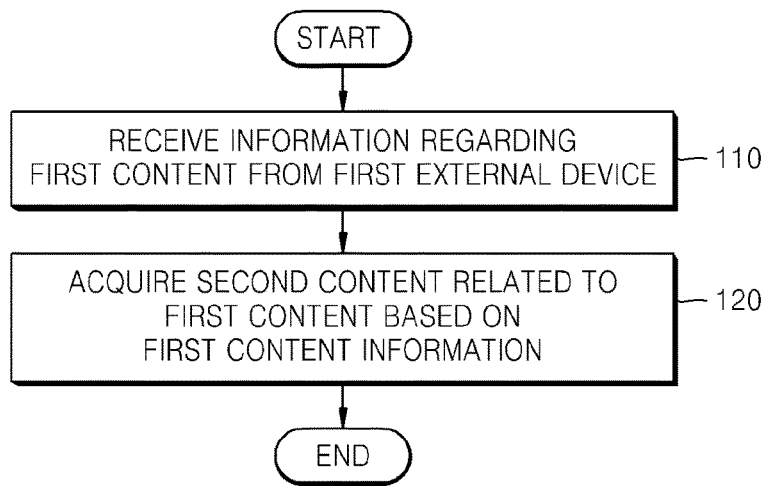
FIG. 1 is a flowchart illustrating a content management method according to an embodiment of the present invention.

FIG. 1 is a flowchart illustrating a content management method according to an embodiment of the present invention.

Referring to FIG. 1, a content management device (e.g., a digital television) receives information regarding first content (e.g., an application A) from a first external device (e.g., a mobile phone) in step 110. For example, the content may include applications or widgets that run on the device.

According to an embodiment of the present invention, the information regarding the first content includes first content identification information or second content identification information. The second content may be the same content as the first content, but may be run on a different type of device than a device where the first content is run. For example, if the first content is a video game application that only runs on a mobile phone utilizing a first Operating System (OS), then the second content may be the same video game application that only runs on a mobile phone utilizing a second OS.

Additionally, the information regarding the first content may include the first content and the second content, or address information (for example, Uniform Resource Locator (URL)) of a second external device where the second content is stored.

When the content management device is connected to a first external device via a predetermined wired or wireless network, the content management device receives information regarding the first content from the first external device. Alternatively, when the first external device downloads the first content from another external device, installs the first content, or executes the first content, the content management device may receive the information regarding the first content from the first external device.

According to another embodiment of the present invention, the content management device and the first external device include respective content lists. When the content management device is connected to the first external device via a network, both content lists are synchronized. Accordingly, if there is content in the content list of the first external device, but that content is not included in the content list of the content management device, the first external device transmits information regarding the content to the content management device. The content lists in the both devices may be integrated and managed as an integrated list.

In step 120, the content management device acquires the second content related to the first content based on the received information regarding the first content. For example, the content management device displays the received information regarding the first content and then provides a selection interface for acquiring the second content. The content management device may acquire the second content from an external device or a server connected to the first external device that installs, runs, or stores the first content, or an external device or a server connected to the content management device.

The external device or the server acts as an application store for each device in terms of concept. That is, an external device or a server stores content to run in each device and allows each device to download requested content there from. For example, if a device storing content is a mobile phone, an external device or a server may be regarded as an application store.

According to an embodiment of the present invention, when a server operates as an application store for a device, the server includes related information regarding content in other servers. For example, the server may include information indicating that Content A in a server A plays the same role as Content B in a server B. The server may acquire the related information from content providers or from information exchange (for example, synchronization) between servers.

If the information regarding the first content does not include content storage address information for the second external device, the content management device may acquire the second content through a server search by using the second content identification information as a search keyword.

If the first content is run on the first external device, the content management device executes the second content in linkage with the first external device, after the second content is acquired. For example, if the first external device (e.g., a mobile device) executes the first content (e.g., an application A), then the content management device (e.g., a digital television) downloads the second content (e.g., an application B), and then automatically executes the second content.

Figure 2:
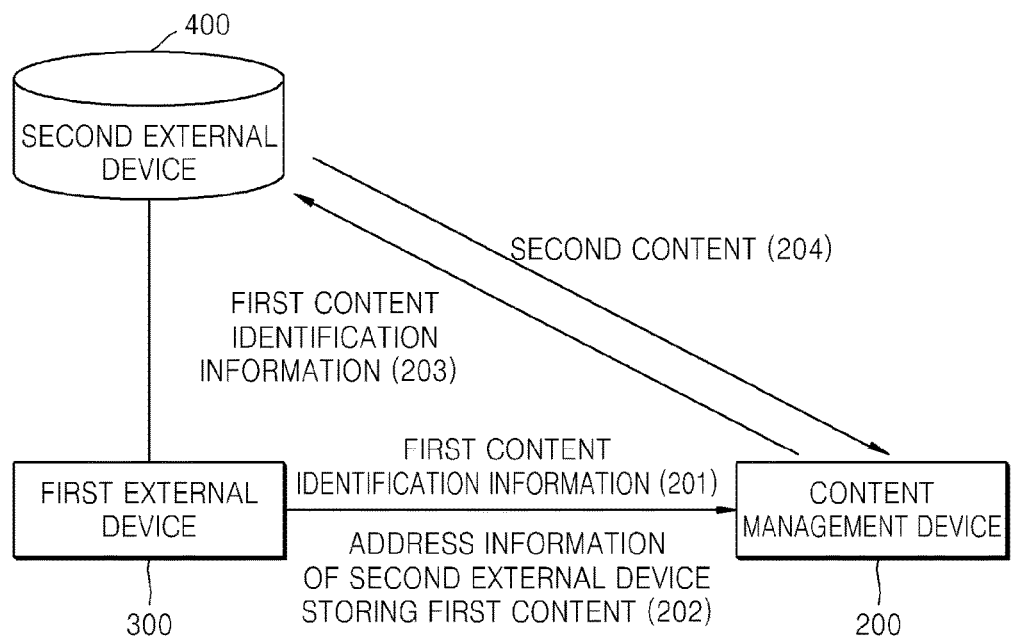
FIGS. 2 to 7 illustrate content and information exchanges between a first external device, a second external device, and a content management device, according to different embodiments of the present invention.

FIG. 2 illustrates content and information exchanges between a first external device, a second external device, and a content management device, according to an embodiment of the present invention.

Referring to FIG. 2, a content management device 200 receives first content identification information from a first external device 300 in step 201. The first external device 300 stores, installs, or executes the first content.

In step 202, the content management device 200 receives address information (for example, A URL) of a second external device 400 storing the first content, from the first external device 300. Although shown as different steps, steps 201 and 202 may be performed in a single step.

The second external device 400 is a server in terms of concept, for example, an application store, which is connected to the first external device 300. However, the second external device 400 may be an application store of the content management device 200.

In step 203, the content management device 200 transmits the first content identification information to the second external device 400 based on the received second external device address information.

In step 204, the second external device 400 transmits second content to the content management device 200 based on the received first content identification information. The second external device 400 stores the second content, knowing that the second content relates to or corresponds to the first content.

Figure 3:
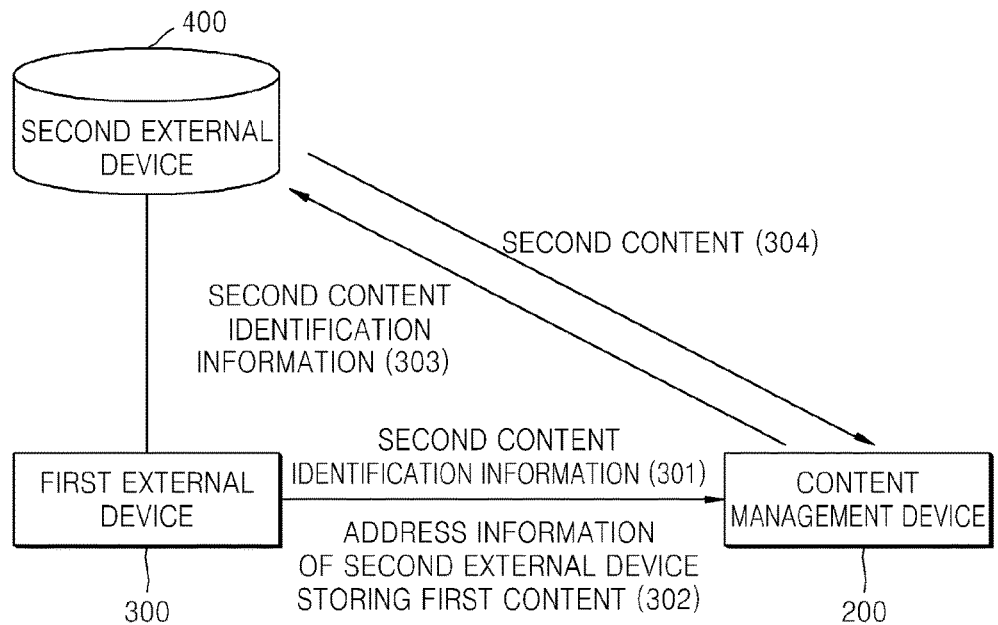

FIG. 3 illustrates content and information exchanges between a first external device, a second external device, and a content management device, according to another embodiment of the present invention.

Referring to FIG. 3, in step 301, a content management device 200 receives second content identification information from a first external device 300. The second content identification information corresponds to first content that the first external device 300 stores, installs, or executes. The second external device 300 knows that the second content relates to or corresponds to the first content. Also, the first external device 300 may receive link information of the first content and the second content from a second external device 400, as will be described in more detail below.

In step 302, the content management device 200 receives address information (for example, a URL) of a second external device 400 storing the first content, from the first external device 300. Again, although shown as different steps, steps 301 and 302 may be performed in a single step.

In step 303, the content management device 200 transmits second content identification information to the second external device 400 based on the received second external device address information. The second external device 400 stores the first content and the second content.

In step 304, the second external device 400 transmits the second content to the content management device 200 based on the received second content identification information.

Figure 4:
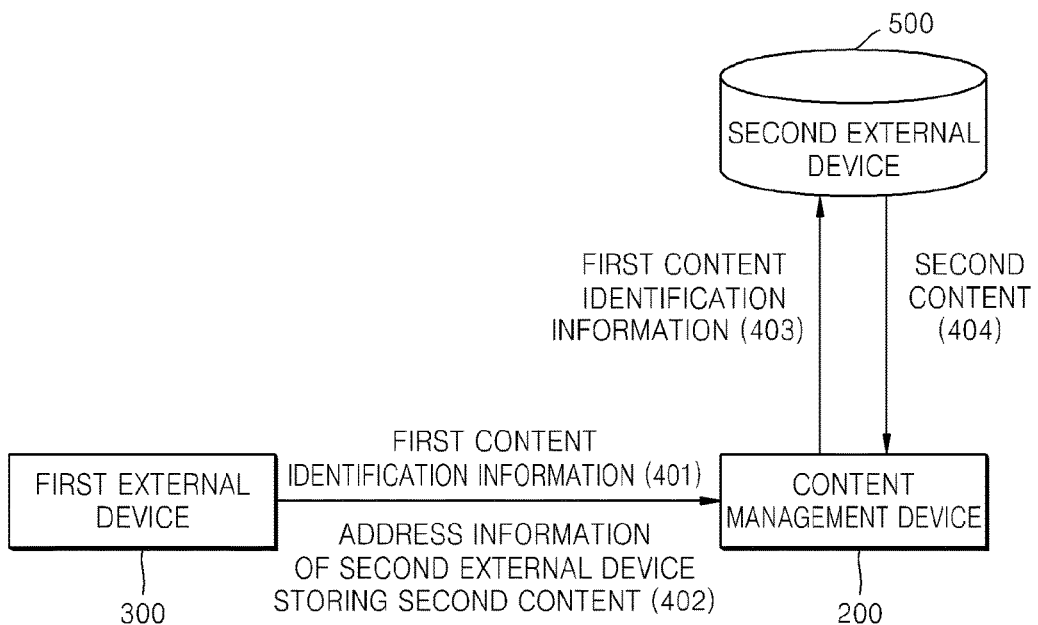

FIG. 4 illustrates content and information exchanges between a first external device, a second external device, and a content management device, according to another embodiment of the present invention.

Referring to FIG. 4, in step 401, a content management device 200 receives first content identification information from a first external device 300 that stores, installs, or executes the first content.

In step 402, the content management device 200 receives address information (for example, URL) of a second external device 500 storing second content, from the first external device 300. Again, although shown as different steps, steps 401 and 402 may be performed in a single step.

In step 403, the content management device 200 transmits the first content identification information to the second external device 500 based on the received second external device address information. The second external device 500 stores second content and also knows that the second content relates to or corresponds to the first content.

The second external device 500 transmits the second content to the content management device 200 based on the received first content identification information.

Figure 5:
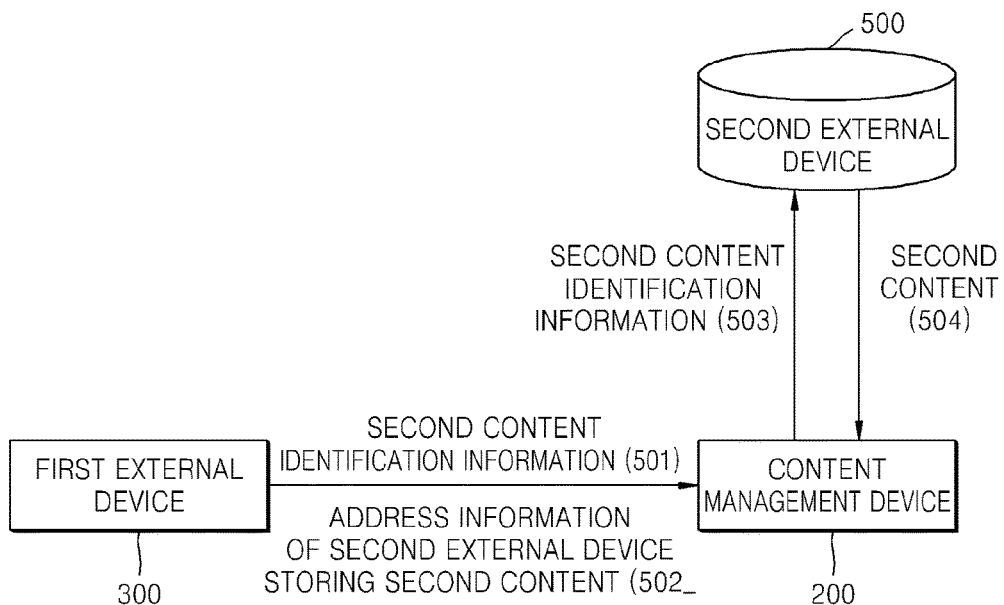

FIG. 5 illustrates content and information exchanges between a first external device, a second external device, and a content management device, according to another embodiment of the present invention.

Referring to FIG. 5, in step 501, a content management device 200 receives second content identification information from a first external device 300 that stores, installs, or executes first content. In this case, the first external device 300 knows that the second content relates to or corresponds to the first content.

In step 502, the content management device 200 receives address information (for example, a URL) of a second external device 500 storing the second content, from the first external device 300. Again, although shown as different steps, steps 501 and 502 may be performed in a single step.

In step 503, the content management device 200 transmits the second content identification information to the second external device 500 based on the received second external device address information.

In step 504, the second external device 500 transmits the second content to the content management device 200 based on the received second content identification information.

Figure 6:
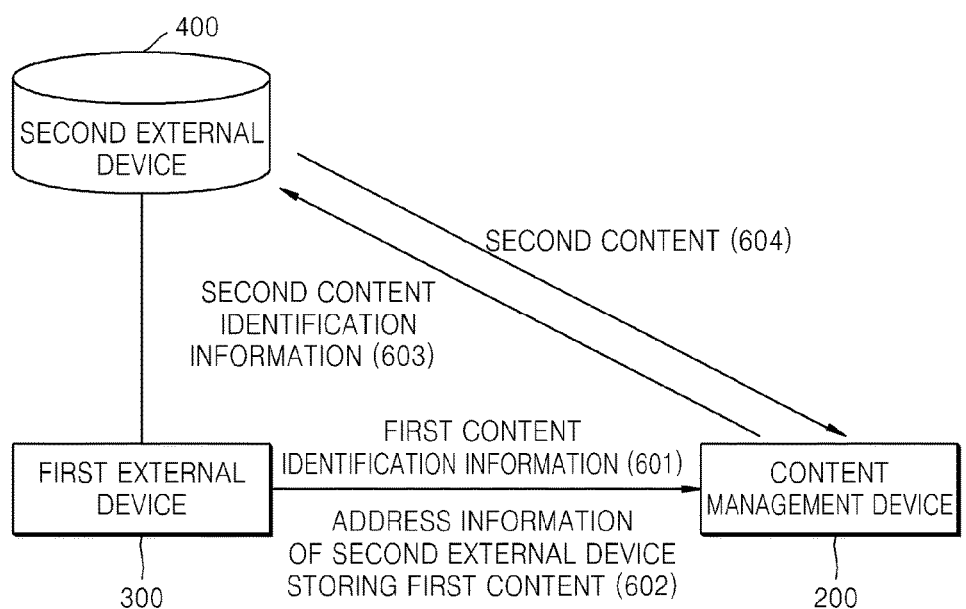

FIG. 6 illustrates content and information exchanges between a first external device, a second external device, and a content management device, according to another embodiment of the present invention.

Referring to FIG. 6, in step 601, a content management device 200 receives first content identification information from a first external device 300 that stores, installs, or executes the first content.

In step 602, the content management device 200 receives address information (for example, a URL) of a second external device 400 storing the first content, from the first external device 300. Again, although shown as different steps, steps 601 and 602 may be performed in a single step.

In step 603, the content management device 200 transmits second content identification information to the second external device 400 based on the received second external device address information. In this case, the content management device 200 knows that the second content relates to or corresponds to the first content. More specifically, the content management device 200 determines the second content related to the first content identification information, extracts the second content identification information, and transmits the second content identification information to the second external device 400. The second external device 400 stores the second content.

In step 604, the second external device 400 transmits the second content to the content management device 200 based on the received second content identification information.

Figure 7:
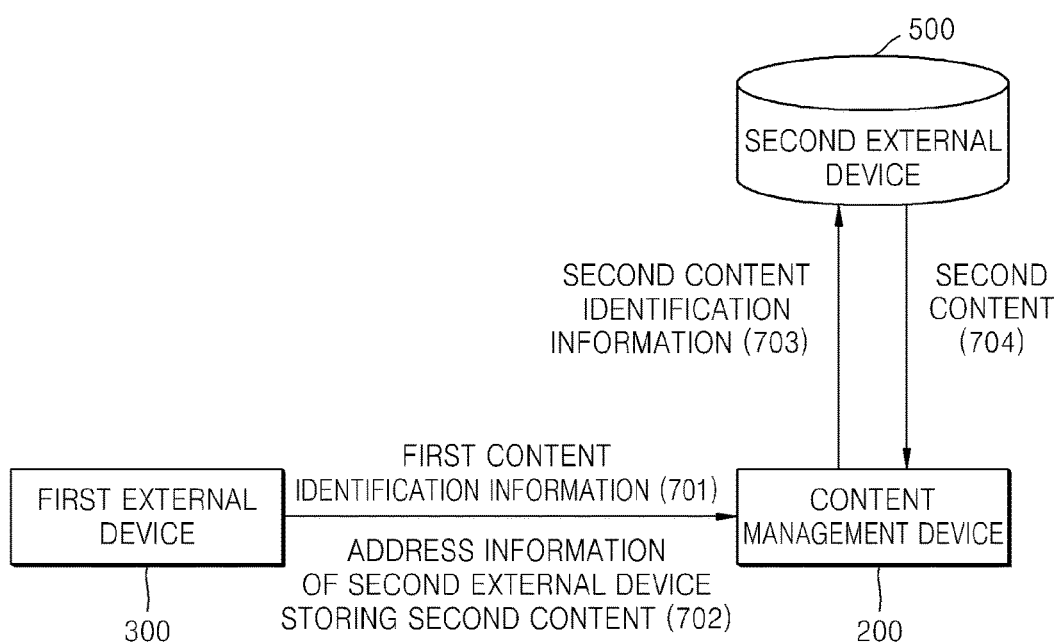

FIG. 7 illustrates content and information exchanges between a first external device, a second external device, and a content management device, according to another embodiment of the present invention.

Referring to FIG. 7, in step 701, a content management device 200 receives first content identification information from a first external device 300 that stores, installs, or executes the first content.

In step 702, the content management device 200 receives address information (for example, a URL) of a second external device 500 storing the second content, from the first external device 300. Again, although shown as different steps, steps 701 and 702 may be performed in a single step.

In step 703, the content management device 200 transmits second content identification information to the second external device 500 based on the received second external device address information. In this case, the content management device 200 knows that the second content relates to or corresponds to the first content. More specifically, the content management device 200 determines the second content related to the first content identification information, extracts the second content identification information, and transmits the second content identification information to the second external device 500.

The second external device 500, which stores the second content, transmits the second content to the content management device 200 based on the received second content identification information.

Figure 8:
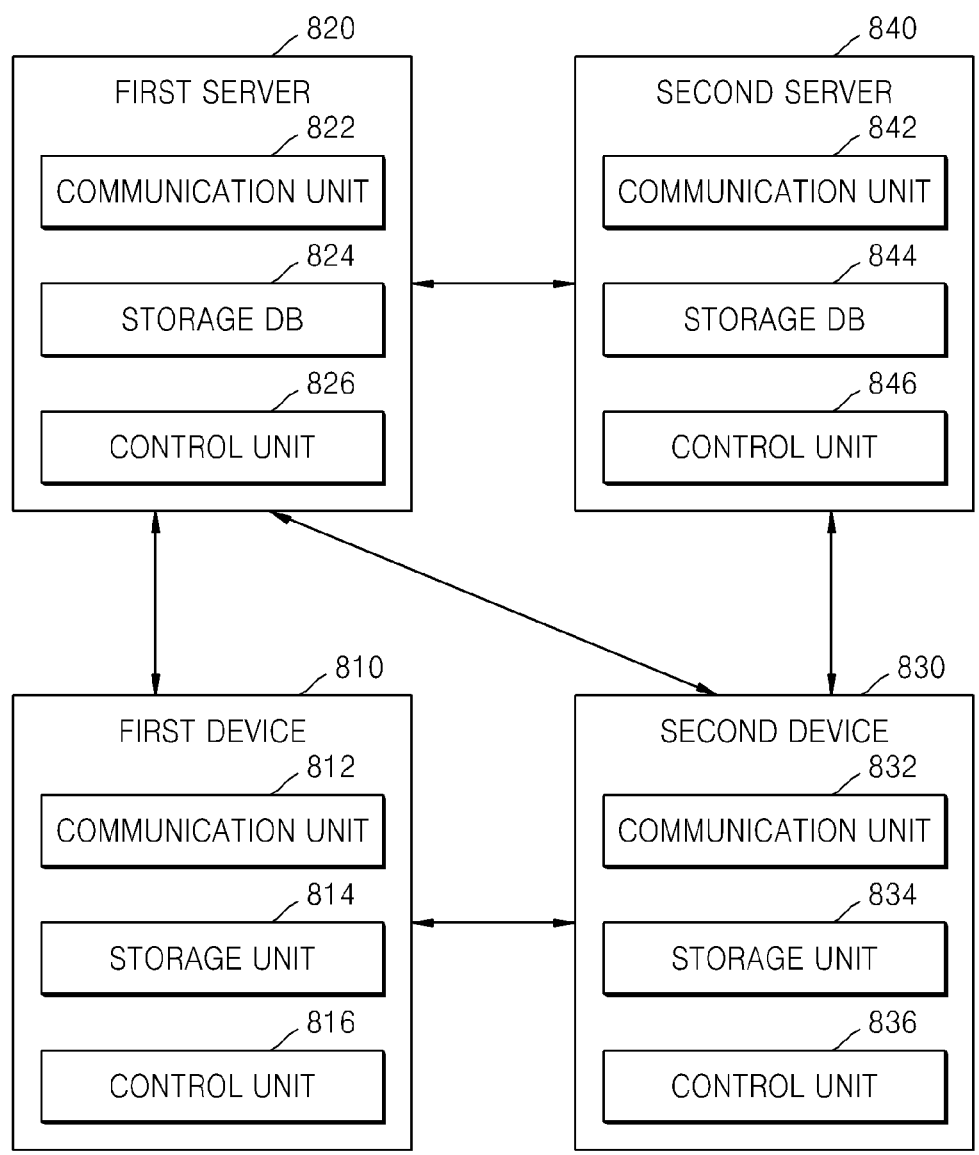
FIG. 8 is a block diagram illustrating a content management system according to an embodiment of the present invention.

FIG. 8 is a block diagram illustrating a content management system according to an embodiment of the present invention.

Referring to FIG. 8, the content management system includes a first device 810, a first server 820, a second device 830, and a second server 840. The first device 810, the first server 820, the second device 830, and the second server 840 include communication units 812, 822, 832, and 842, storage units (or storage Data Bases (DBs)) 814, 824, 834, and 844, and control units 816, 826, 836, and 846, respectively. The communication units 812, 822, 832, and 842 allow each of the first device 810, the first server 820, the second device 830, and the second server 840 to communicate with each other. The storage units (or storage DBs) 814, 824, 834, and 844 store applications and widgets, and other associated information. The control units 816, 826, 836, and 846 control the overall operations of each of the first device 810, the first server 820, the second device 830, and the second server 840, respectively.

The second device 830 represents a content management device 200, as described above with reference to FIGS. 2-7, and the first device 810, which corresponds to the first external device 300 illustrated in FIGS. 2-7, transmits information regarding first content to the second device 830. Additionally, the first server 820, which corresponds to the second external device 400, as illustrated in FIGS. 2, 3, and 6, may act as an application store in the first device 810 in terms of concept. That is, the first server 820 stores content that runs on the first device 810 and allows the first device 810 to download the content. For example, when the first device 810 is a mobile phone, the first server 820 may be an application store.

Likewise, the second server 840, which corresponds to the second external device 500, as illustrated in FIGS. 4, 5, and 7, plays the same role as the first server 820 with respect to the second device 830.

Additionally, the content management methods described above may be realized with computer readable codes on a non-transitory computer readable recording medium. The computer readable recording medium is any data storage device that can store data, which can be thereafter read by a computer system. Examples of the computer readable recording medium include a Read Only Memory (ROM), a Random Access Memory (RAM), a Compact Disc ROM (CD-ROM), magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to certain embodiments thereof, it will be understood by those skilled in the art that various changes in form and details may be made therein without departing from the spirit and scope of the present invention as defined by the appended claims and their equivalents.

What is claimed is:

1. A content management method in a device, the method comprising:
   establishing a connection with an external device;
   receiving, from the external device, information regarding a first application currently being installed on the external device;

acquiring from a server a second application that is related to the first application, based on the information regarding the first application and information of the device, the second application being acquired using a keyword search when the information regarding the first application does not include storage address information for acquiring the second application; and upon acquiring the second application, automatically installing the second application in the device, and executing the second application in the device if the first application is being executed in the external device and the external device is connected to the device.

2. The content management method of claim 1, wherein the information regarding the first application includes identification information of the first application, and wherein acquiring the second application related to the first application comprises:

transmitting the identification information of the first application to the server based on address information of the server; and receiving the second application from the server.

3. The content management method of claim 1, wherein the information regarding the first application includes identification information of the first application, and wherein acquiring the second application related to the first application comprises:

determining the second application related to the identification information of the first application;

transmitting identification information of the second application to the server based on address information of the server; and receiving the second application from the server.

4. The content management method of claim 1, wherein the information regarding the first application includes identification information of the second application, and wherein acquiring the second application related to the first application comprises:

transmitting the identification information of the second application to the server based on address information of the server; and receiving the second application from the server.

5. The content management method of claim 1, wherein the device receives the information regarding the first application from the external device when connected to the external device via a network.

6. The content management method of claim 1, wherein receiving the information regarding the first application from the external device comprises:

synchronizing an application list of the external device with an application list of the device; and if there is an application in the application list of the external device that is not in the application list of the device, receiving the information regarding the first application in the application list of the external device.

7. The content management method of claim 1, wherein acquiring the second application related to the first application comprises:

setting the information regarding the first application as a search keyword;

searching for the second application from the server by using the search keyword; and receiving the second application from search results.

8. The content management method of claim 1, wherein acquiring the second application related to the first application comprises:

providing an interface for a user input with respect to the second application related to the first application based on the information regarding the first application;

receiving a user input via the interface; and receiving the second application based on the user input.

9. The content management method of claim 1, the information regarding first application includes an identifier of the first application and link information for obtaining the second application.

10. The content management method of claim 1, the first application performs a function in the external device, and the second application performs the same function in the device.

11. The content management method of claim 1, wherein the first application is only supported by a first operating system that runs on the external device and the second application is only supported by a different second operating system that runs on the device.

12. A content management device comprising:
a memory storing instructions; and
a processor configured to execute the instructions to:
establish a connection with an external device;
receive, from the external device, information regarding a first application currently being installed on the external device;
acquire from a server a second application that is related to the first application, based on the information regarding the first application and information of the content management device, the second application being acquired using a keyword search when the information regarding the first application does not include storage address information for acquiring the second application; and
upon acquiring the second application, automatically install the second application in the content management device, and execute the second application in the content management device if the first application is being executed in the external device and the external device is connected to the content management device.

13. The content management device of claim 12, wherein the information regarding the first application includes identification information of the first application, and wherein the processor is configured to execute the instructions to:

transmit the identification information of the server based on address information of the server; and receive the second application from the server.

14. The content management device of claim 12, wherein the information regarding the first application includes identification information of the first application, and wherein the processor is configured to execute the instructions to:

determine the second application related to the identification information of the first application;

transmit identification information of the second application based on address information of the server; and receive the second application from the server.

15. The content management device of claim 12, wherein the information regarding the first application includes identification information of the second application, and wherein the processor is configured to execute the instructions to:

transmit the identification information of the second application to the server based on address information of the server; and receive the second application from the server.

16. The content management device of claim 12, wherein the processor is configured to execute instructions to:
receive the information regarding the first application from the external device when the content management device is connected to the external device via a network.

17. The content management device of claim 12, wherein the processor is configured to execute the instructions to:
synchronize an application list of the external device with an application list of the content management device; and
if there is an application in the application list of the external device that is not in the application list of the content management device, receive the information regarding the first application in the application list of the external device through a communication unit.

18. The content management device of claim 12, wherein the processor is configured to execute the instructions to:
set the information regarding the first application as a search keyword;
search for the second application from the server by using the search keyword; and
receive the second application based on search results.

19. The content management device of claim 12, wherein the processor is configured to execute the instructions to:
provide an interface for a user input with respect to the second application related to the first application based on the information regarding the first application;
receive a user input via the interface; and
receive the second application based on the user input.

20. The content management device of claim 12, wherein the information regarding first application includes an identifier of the first application and link information for obtaining the second application.

21. The content management device of claim 12, wherein the first application is only supported by a first operating system that runs on the external device and the second application is only supported by a different second operating system that runs on the content management device.

22. A non-transitory computer readable medium for storing an executable program in a device, which when executed performs a content management method comprising:
establishing a connection with an external device;
receiving, from the external device, information regarding a first application currently being installed on the external device;
acquiring from a server a second application that is related to the first application, based on the information regarding the first application and information of the device, the second application being acquired using a keyword search when the information regarding the first application does not include storage address information for acquiring the second application; and
upon acquiring the second application, automatically installing the second application in the device, and executing the second application in the device if the first application is being executed in the external device and the external device is connected to the device.

23. The non-transitory computer readable medium of claim 22, wherein the information regarding first application includes an identifier of the first application and link information for obtaining the second application.

24. The non-transitory computer readable medium of claim 22, wherein the first application is only supported by a first operating system that runs on the external device and the second application is only supported by a different second operating system that runs on the device.

* * * * *